United States Patent Office 3,125,484
Patented Mar. 17, 1964

3,125,484
FLEXIBLE PLASTIC SHEET HAVING OPALESCENT FINISH
Victor H. Weiss, Stratford, Conn., assignor to E. I. du Pont de Nemours and Company, Wilmington, Del., a corporation of Delaware
No Drawing. Filed Nov. 12, 1959, Ser. No. 852,235
1 Claim. (Cl. 161—6)

This invention relates to flexible plastic sheet material having a decorative opalescent finish which is lustrous and colorful.

For the purpose of this invention, the term "opalescent finish" refers to a lustrous finish which has either a milky or non-milky iridescent appearance, i.e., a pearly or silky type of luster.

An important object of this invention is the provision of plastic flexible sheet materials having a novel pearly, lustrous and colorful decorative finish. A further object is the provision of such a sheet material in which the color of the finish has a high degree of brilliance. A still further object is the provision of such a sheet material in which the color of the finish has a high degree of saturation. Further objects of the invention will be apparent from the description which follows.

The invention broadly comprises a flexible sheet material having a decorative finish comprising an opaque base layer and, integrally overlying said opaque base layer, a layer of colored transulcent composition which contains an organic film forming material, pearl essence, and at least one member of a specific group of low-hiding lightfast colored pigments as described hereinafter. This invention permits the production of colored opalescent plastic upholstery materials of suitable light-fastness in more vivid and brilliant colors than have heretofore been known in this class of materials.

It is sometimes preferred to modify the reflection characteristics of the finish by providing a grooved or embossed pattern in the surface of the plastic sheet material. This can be done either before or after the translucent layer is applied. An embossed surface is also employed when the object is to produce a Spanish or antique type of finish, i.e., having the translucent layer only in the valleys of the embossed pattern.

The layer of colored translucent composition overlying the opaque base layer contains the following essential components: an organic film forming material, pearl essence and one or more members of a certain group of light-fast, low-hiding colored pigments as defined in detail hereinafter.

Suitable organic film formers are well known in the coating art, including for example drying oils, oil modified alkyd resins, oleoresinous varnishes, elastomers, natural resins and a host of synthetic resins, both thermoplastic and thermosetting. The most attractive finishes are usually obtained when the film former in the translucent layer is substantially transparent. Translucent film formers, however, are also useful.

A preferred film former for both the opaque layer and the translucent layer is a vinyl chloride resin, either alone or in combination with another film former compatible therewith. By the term "vinyl chloride resin" is meant polyvinyl chloride or a copolymer of vinyl chloride with a minor proportion of another ethylenically unsaturated monomer copolymerized therewith, e.g., vinyl acetate or vinylidene chloride.

The pearl essence in the translucent layer can be the natural type derived from fish scales such as by comminuting said fish scales, or a synthetic type. Various silky-looking metallic salts of proper crystalline structure, such as the chlorides of bismuth, tin, antimony and mercury, as well as bismuth subnitrate, lead iodide, bismuthoxychloride, lead phosphate, bariumthiosulfate and zinc ammonium purine phosphate are well known examples of the synthetic type of pearl essence.

Some of the most attractive finishes obtainable in accordance with this invention result from the use of a synthetic pearl essence having a somewhat milky luster, for example, bismuth chloride, in combination with an opaque layer having a brilliant color. When the color of the finish is to be of high brillance, synthetic pearl essence is usually preferred. Such a finish has a colored silky opalescence of considerable eye appeal.

On the other hand, natural pearl essence may be preferred when the objective is to produce a finish having a color of high saturation.

The pearl essence should be thoroughly dispersed through the translucent layer. It should be present in sufficient quantity to give the finish the desired opalescent luster without being detrimental to the desired color characteristics, such as hue, brilliance, saturation, depth and/or polychromatic effect. The optimum quantity of pearl essence to use in a particular finish is governed by such factors as the color of the opaque layer, the thickness of the translucent layer, the concentration and hiding power of the translucent pigment and the luster and hiding power of the pearl essence itself. Generally speaking, however, at least about 2% of a pearl essence based on the weight of the translucent layer is required to yield a satisfactory luster; and more than about 25% usually results in poor appearance due to excessive dilution and/or hiding of the color.

The pearl essence is usually best dispersed first in a vehicle which wets the pearly particles, such as a dilute solution of film former in a volatile organic solvent, to facilitate its incorpartion into the composition of the translucent layer.

When using a synthetic pearl essence in the presence of a film former which tends to cause darkening of the finish upon extended exposure to light, heat and moisture; this tendency can be minimized by the addition of well known stabilizers for the film former. For example, a blend of barium/cadmium complex salt stabilizer and zinc complex salt stabilizer is often beneficial with a vinyl chloride resin film former.

An essential component of the translucent layer is at least one light-fast colored pigment of relatively low hiding power (i.e., low in opacity) selected from the following group:

Alumina hydrate lake of flavanthrone
Alumina hydrate lake of dibromoanthanthrone
Alumina hydrate lake of polychloro-anthraquinone 2, 1(N) benzacridone
Alumina hydrate lake of tri- to tetra-bromo pyranthrone
Alumina hydrate lake of a perylene
Alumina hydrate lake of dibromopyranthrone
Alumina hydrate lake of anthrimide
Alumina hydrate lake of dimethoxy dibenzene anthanthrone
A quinacridone or substituted quinacridone pigment, such as, e.g., those made by the process described in U.S. Patent 2,821,529

The red gamma crystal phase quinacridone described in U.S. Patent 2,844,581 and the violet beta crystal phase quinacridone described in U.S. Patent 2,844,485, are especially useful in the translucent layer. Although not preferred, it is possible to use the toners (i.e., non-extended form) in place of alumina hydrate lakes in the above list of colors. In the case of the quinacridone colors, the non-extended form is preferred; however, the alumina hydrate lake thereof is useful. The alumina hydrate lakes in the above list are the particularly preferred low-hiding pigments in practicing this invention.

The low-hiding pigment should be in a thorough state of dispersion in the translucent layer.

The hue, saturation and/or brilliance of the low-hiding pigment can be either the same as or different than that of the opaque layer. Especially attractive polychromatic opalescent finishes result from the use of low hiding pigments the color of which is more saturated than that of the opaque layer.

The quantity of low-hiding pigment to be incorporated into the translucent layer will be dictated largely by such factors as the overall color effect desired in the finish and the hiding power of the particular pigment involved. In most cases, however, the desired results are obtained when the translucent layer contains about .5% to 15% weight percent of low hiding pigment.

One convenient method of forming the layer of translucent composition comprises (*a*) preparing a liquid coating composition containing the essential ingredients, i.e., film former, pearl essence and low-hiding pigment; (*b*) applying a layer of the liquid composition over the opaque layer by any known coating method, e.g., by rolling, printing, or spraying; and (*c*) drying or otherwise solidifying the applied translucent layer.

Another useful method comprises making a preformed film of the translucent composition and thereafter laminating the film to the opaque layer, for example, by hot-pressing. A layer of clear adhesive can be used if necessary to achieve the necessary bond.

In addition to the essential ingredients described above, the composition from which the translucent layer is formed can contain such well known additives as driers, catalysts, solvents, viscosity modifiers, plasticizers and stabilizers.

It is sometimes advantageous to apply a clear protective coating over the translucent layer. For instance, the wear resistance of the finish on upholstery material is improved in this manner.

The advantages of the finish of this invention are well illustrated by comparison with a finish comprising flaked aluminum pigment as the principal luster producing ingredient. An important advantage of this novel finish resides in the softer, silkier, warmer, richer, and deeper effect of the luster and color. Another advantage is that this finish is obtainable in a wider range of color brilliance, from the light pastels to very dark colors. It is also obtainable in colors of greater saturation, such as highly saturated reds and yellows. Plastic upholstery materials having this new finish are much less subject to unsightly marking from scuffing. In laminating the product of this invention to other materials by means of dielectric sealing operations arcing between the electrodes and thus burning holes in the material is not encountered as in the case with lustrous finished material employing metallic pigments. Still another advantage is the superior polychromatic effect obtained when the color of the translucent pigment is different from that of the opaque layer.

It is evident that the invention has specific utility in the manufacture of colored opalescent flexible plastic sheet materials for numerous applications, including in particular upholstery, interior lining and trim for automobiles, case and luggage coverings, bookbinding and purses.

The following examples are intended to illustrate the invention and not to limit it in any way. All quantities are given on a weight basis unless otherwise indicated.

*Example 1*

A brilliant red plastic coated fabric of good upholstery quality is prepared by calender coating a 50 inch wide knit cotton fabric having 31 wales and 33 courses with 32 ounces per linear yard of the following composition:

| Opaque colored plastic composition: | Parts by weight |
|---|---|
| Polyvinyl chloride | 34.97 |
| Calcium carbonate filler | 9.67 |
| Coprecipitated barium and cadmium salts of fatty acids (Mark M) | 1.33 |
| Zinc complex stabilizer (Mark PL) | 0.24 |
| Epoxidized soya bean oil ("Paraplex" G-62) | 2.42 |
| Di(2 ethyl hexyl) phthalate | 23.22 |
| Di(2 ethyl hexyl) azelate (Plastolein 9058) | 9.67 |
| Stearic acid | 0.24 |
| Colored pigment dispersion [1] | 4.84 |
| | 86.20 |

| [1] Colored pigment dispersion: | Parts by weight |
|---|---|
| Titanium dioxide | 21.9 |
| Molybdate orange | 19.0 |
| Pigment—scarlet lake | 2.8 |
| Carbon black | 0.1 |
| Calcium carbonate | 13.4 |
| Di(2 ethyl hexyl) phthalate | 40.1 |
| Blown castor oil | 2.7 |
| | 100.0 |

The resulting plastic coating on the fabric, which constitutes the opaque colored layer of the finish being produced, is doctor roll coated with 2 ounces per linear yard (dry basis) of the following composition:

| Translucent coating composition: | Parts by weight |
|---|---|
| 14% clear solution of polyvinyl chloride (Geon 101) in methyl ethyl ketone | 67.5 |
| 25% clear solution of polymethyl methacrylate ("Lucite" 41) in methyl ethyl ketone | 17.5 |
| Synthetic pearl essence [1] (Nacromer GVA) | 5.0 |
| 18% solution of red pigment dispersion in methyl ethyl ketone [2] | 10.0 |
| | 100.0 |

[1] A dispersion of about 35% bismuth chloride crystals, 6.5% polyvinyl chloride and 58.5% methyl ethyl ketone.

[2] The red pigment dispersion in the above formula, prior to dilution with methyl ethyl ketone, consists of 65% of a co-polymer of 87% vinyl chloride and 13% vinyl acetate ("Vinylite" VYHH), 5% of di(2 ethyl hexyl) phthalate, and 30% of a gamma crystal phase quinacridone red pigment. This dispersion is prepared by grinding the three ingredients together in a conventional pigment grinding apparatus adapted for maximum dispersion of pigment, such as, e.g., that described in U.S. Patent 2,855,156.

The above described translucent coating composition contains about 47 parts by weight of polymethyl methacrylate per 100 parts by weight of polyvinyl chloride.

As a final manufacturing operation, the coated material is passed through a heat zone to dry the translucent coating.

The product of this example is a soft and silky appearing upholstery material having a pleasant milky opalesence and a red color of high brilliance. The finish has a mild polychromatic or two-tone effect, since the color of the opaque layer is of greater brilliance than that of the low-hiding pigment in the translucent layer. After extended use inside an automobile subjected to normal use, the color of the product remains substantially unchanged.

A portion of the product is roller embossed with the design of U.S. Design Patent D. 175,817, resulting in even greater attractiveness of the colored opalescent finish.

*Example 2*

An opalescent plastic upholstery material of vivid gold color is produced by repeating Example 1 except for the following differences:

The colored pigment dispersion in the opaque colored plastic composition forming the surface of the base layer is taken from a batch of the following composition:

| | Parts by weight |
|---|---|
| Titanium dioxide | 32.6 |
| Medium chrome yellow | 15.1 |
| Ferric oxide hydrate (Mapico light lemon yellow) | 4.5 |
| Calcium carbonate | 9.1 |
| Di(2 ethyl hexyl) phthalate | 36.6 |
| Blown castor oil | 2.1 |
| | 100.0 |

The translucent coating composition employed in this example has the following formula:

| | Parts by weight |
|---|---|
| 12% solution of polyvinyl chloride ("Geon" 101) in methyl ethyl ketone | 66.5 |
| 25% solution of polymethyl methacrylate ("Lucite" 41) in methyl ethyl ketone | 17.5 |
| Fish scale pearl essence dispersion [1] | 5.0 |
| 20% solution of yellow pigment dispersion in methyl ethyl ketone [2] | 5.0 |
| 20% solution of orange pigment dispersion in methyl ethyl ketone [3] | 1.0 |
| Methyl ethyl ketone | 5.0 |
| | 100.0 |

[1] A dispersion comprising about 35% natural fish scale pearl essence, about 6.5% polyvinyl chloride and about 58.5% methyl ethyl ketone.

[2] The yellow pigment dispersion in the above formula, prior to dilution with methyl ethyl ketone, consists of 45% of a copolymer of 87% vinyl chloride and 13% vinyl acetate, 5% of di(2 ethyl hexyl) phthalate, and 50% of a yellow pigment which is the alumina hydrate lake of flavanthrone.

[3] The orange pigment dispersion in the above formula, prior to dilution with methyl ethyl ketone, consists of 75% of a copolymer of 87% vinyl chloride and 13% vinyl acetate, 5% of di(2 ethyl hexyl) phthalate, and 20% of an orange pigment which is the alumina hydrate lake of dibromoanthanthrone.

The above described translucent coating composition contains about 55 parts by weight of polymethyl methacrylate per 100 parts by weight of polyvinyl chloride.

The product of this example has a relatively non-milky or clear opalescence and a gold color of high saturation (vividness of hue).

While there are above disclosed but a limited number of embodiments of the structure, process and product of the invention herein presented, it is possible to produce still other embodiments without departing from the inventive concept herein disclosed, and it is desired therefore that only such limitations be imposed on the appended claim as are stated therein, or required by the prior art.

I claim:

A plastic sheet material comprising:

(a) a substantially opaque colored film base layer comprising a vinyl chloride resin and opaque pigments, (b) integrally bonded to the surface of said base layer a translucent colored film layer consisting essentially of—

2–25% pearl essence selected from the class consisting of fish scales, bismuth, subnitrate, lead iodide, bismuth oxychloride, lead phosphate, barium thiosulfate, zinc ammonium purine phosphate and chlorides of bismuth, tin, antimony and mercury, .5–15% of a translucent colored pigment selected from the class consisting of quinacridone, flavanthrone, dibromoanthanthrone, polychloroanthraquinone 1,2(n) benzacridone, tri- to tetrabromopyranthrone, perylene, dibromopyranthone, anthrimide, dimethoxy dibenzene anthanthrone, the alumina hydrate lakes of said pigments, said percentages being based on the total dry weight of said translucent layer, and the balance of said translucent layer consisting essentially of about 2 parts of polyvinyl chloride per 1 part of polymethyl methacrylate, (c) the color of said opaque layer being of greater brilliance than the translucent pigments in said translucent layer.

References Cited in the file of this patent

UNITED STATES PATENTS

| 1,675,642 | Clewell | July 3, 1928 |
| 1,743,447 | Ganzinotti | Jan. 14, 1930 |
| 2,078,007 | Laurie | Apr. 20, 1937 |
| 2,480,750 | Leary | Aug. 30, 1949 |
| 2,851,370 | Blank | Sept. 9, 1958 |

FOREIGN PATENTS

| 772,850 | Great Britain | Apr. 17, 1957 |